United States Patent Office 3,513,067
Patented May 19, 1970

---

3,513,067
METHOD OF PRODUCING AN ORIENTED FIBER REINFORCED PLASTIC ARTICLE
Giorgio Tangorra, Milan, Italy, assignor to Pirelli, Societa per Azioni, Milan, Italy
No Drawing. Filed Jan. 30, 1967, Ser. No. 612,342
Claims priority, application Italy, Feb. 10, 1966, 2,911/66
Int. Cl. B29d *3/02*
U.S. Cl. 264—108                                      6 Claims

ABSTRACT OF THE DISCLOSURE

Fibers disposed within a plastic material, e.g., a vulcanizable rubber, are oriented so that the average number of fibers in a unit area of a plane perpendicular to the direction of the prevailing orientation is at least about three times the average number of fibers in a unit area of a plane parallel to the direction of orientation. The fibers are oriented by stretching prior to setting the plastic material.

BACKGROUND OF THE INVENTION

Field of the invention

The present invention relates to the production of fiber reinforced plastic articles in which the fibers are incorporated into a sheet or other article, and to the method of producing the fiber reinforced articles.

Description of the prior art

It is known that when segments of a filamentary material having an elongated form, hereinafter referred to as fibers, are incorporated into a sheet of rubber or other plastic material, the strength of the sheet is increased so that it in turn can be used as a reinforcing element to improve the mechanical characteristics of pneumatic tires, belts, and the like. It is also known that the effectiveness of the fibers in reinforcing the sheet in a certain direction is increased when the fibers are disposed with their axes oriented in said direction. Such an orientation increases the elastic modulus and the tensile strength of the sheet in the direction of orientation. Mechanical processes are known for the purpose of orienting fibers which were initially substantially uniformly randomly disposed throughout a plastic material such as uncured rubber. In general, these processes exploit the internal shear rate formed in the material by its passage through suitable apparatus such as extruders, calenders, mixers and the like. However, such processes obtain only a partial orientation of the fibers, that is, only a certain percent of the fibers are oriented. Moreover, the efficiency of said processes is reduced when the rheological characteristics of the material differ from those which are normally defined as "Newtonian characteristics" and which refer to materials having a constant viscosity during shear. In other words, by extruding, for instance, an elastomeric material possessing highly non-Newtonian characteristics, a high shear rate takes place only in proximity to the walls of the extruder nozzle. In the remaining part of the nozzle section, the material flows without showing any shear rate or a very reduced shear rate. This difficult inconvenience is maximized when the material slides on the nozzle walls, thus causing the elimination of the shear rate. It is known that elastomeric material has considerable non-Newtonian characteristics, which are enhanced by the presence of fibers embedded in the material.

Accordingly, the orientation is limited to only a fraction of the fibers embedded in the material, and the oriented fibers are nonuniformly distributed in the section orthogonal or at right angles to the extrusion (or calendering) direction. Furthermore, the non-oriented fibers, which for the above reasons may be considerable number, maintain their original non-rectilinear configuration, or thier original configuration is only partially modified.

A further disadvantage common to the above described processes is the existence of backflow which causes a mixing action which, in the subsequent passages of the material through the apparatus partially destroys the orientation achieved in a prior passage so that the overall efficiency of the processing is very poor or even negligible. For the above described reasons it is very difficult to obtain by such mechanical processes an anisotropy between a ratio of the elastic moduli in two orthogonal directions which is higher than 2:1. The term anisotropy refers to a difference in properties when tested along different axes.

According to other known processes, it is possible to obtain a certain degree of fiber orientation by stretching an elastomeric material during molding. For example, in the production of pneumatic tires, the passage of a reinforcing material constituted by an uncured rubber sheet containing fibers disposed at random from the building cylinder to the toroidal mold which is larger than the cylinder can cause a stretching action which reaches at most 60% so that only a limited degree of orientation of the fibers is obtainable. Moreover, according to this operation, the article stretched in the circumferential direction remains essentially unaffected in the transverse direction due to the presence of the textile insert and is therefore unable to shrink in the latter direction, and the anisotropy due to the fibers is negligible.

SUMMARY OF THE INVENTION

The present applicant has unexpectedly ascertained that by subjecting the whole section of a sheet of plastic material containing uniformly and randomly dispersed fibers to a global stretching condition of a large magnitude, the above drawbacks are eliminated and a nonlinear accentuation of the anisotropic characteristics is advantageously obtained. It has been noted that the degree of anisotropy is nearly parabolically related to the amount of stretching so that anisotropy values acceptable for practical applications can be obtained only by means of a high degree of stretching. In accordance with the present invention, a sheet of plastic material containing randomly disposed fibers is subjected to a unidirectional extension or stretching, the amount of which, taking into account the possible elastic recovery, is over 150%. This stretching achieves a high degree of fiber orientation, a substantially uniform distribution of the oriented fibers within the plastic material, and the fibers have a rectilinear configuration.

The product of the aforementioned steps is an article of plastic material containing oriented fibers and having the following characteristics:

(a) A prevailing orientation of the fibers such that the average number of fibers within a unit area of a section taken along a plane orthogonal to the direction of the prevailing orientation is at least equal to three times the number of fibers within a unit area of a section taken along a plane parallel to the direction of the prevailing orientation and disposed in such a way as to intersect the section having the smallest thickness;

(b) Uniformly disposed oriented fibers;

(c) Prevailing rectilinear oriented fibers; and (d) A final product in which after setting by means of vulcanization, cross-linking or other treatments, the ratio between the elastic modulus in the direction of the prevailing orientation and the elastic modulus in a direction orthogonal to the first and to the direction of the smallest side of the article is greater than 3.

DESCRIPTION OF THE PREFERRED EMBODIMENTS

The plastic material in which the fibers are embedded may be any natural or synthetic plastic material which can be set by vulcanization or cross-linking, or other treatment, and include, for example, natural rubber, synthetic rubbers, polyurethane, and thermoplastic resins. Typical synthetic rubbers include the rubbery polymers of butadiene-1,3, isoprene, 2-chlorobutadiene-1,3 and the like, as well as rubbery copolymers of butadiene and styrene known as GRS, copolymers of butadiene-acrylonitrile, butadiene-methacrylonitrile, butadiene-ethyl-methacrylate and the like, butyl rubbers such as copolymers of a $C_4$ to $C_8$ isoolefin such as isobutylene with a $C_4$ to $C_{14}$ multiolefin, preferably a conjugated diolefin such as isoprene or butadiene, olefinic copolymers such as ethylene-propylene copolymers and terpolymers. Typical useful resins include polyethylene, polypropylene, polyvinyl chloride, and the like.

It will be understood that the plastic materials has a plasticity sufficient to allow the incorporation of the fibers and to permit the other operations to be described hereinafter, and also contains conventional compounding ingredients intended to impart the desired properties to the final article. For example, if the compound is based on rubber, it contains typical vulcanizing agents such as sulfur and/or zinc oxide together with ingredients such as reinforcing fillers or diluents to modify the mechanical properties of the article, as well as known ingredients to improve the bond of the rubber to the fibers incorporated therein. Such an adhesive ingredient may be, for example, a phenol aldehyde/rubber latex adhesive composition.

The fibers embedded in the plastic material can be fibers of natural, artificial or synthetic textile material, for example, cotton, cellulose acetate (rayon), a polyamide such as any one of the nylons, or a polyester. For the purpose of the present invention, the term "fibers" also includes metal, glass and asbestos threads divided into segments which generally have an elongated shape. The fibers may have a length between 0.5 and 50 mm., with the fibers embedded in a given article having the same or different lengths included within the above range. The weight of the fibers employed is at least about 5 parts per 100 parts of the composition in which the fibers are embedded and may range up to about 70 parts per 100 parts of the composition, and preferably the fibers are employed in an amount of about 10 to 30 parts per 100 parts of the composition. The fibers employed must be relatively inextensible, that is, the elastic modulus of the fibers must be at least 5 times the elastic modulus of the elastic material in which they are embedded.

As a result of the substantially inextensible nature of the fibers, the fibers during the stretching applied to the material in which the fibers are embedded, besides being oriented, tend to assume a rectilinear configuration so that in the final product, (namely after vulcanization in the case of a rubber sheet) the elastic modulus in the direction of the prevailing orientation is considerably higher than the elastic modulus which would be achieved if the fibers were oriented in the same amount but did not have a rectilinear configuration.

To impart to the largest possible number of fibers a rectilinear configuration having a positive effect on the mechanical characteristics of the product, it is necessary to apply to the plastic material a stretching action stronger than that obtainable by already known processes.

In this way, in the direction of the stretching, there is a greater number of oriented fibers, and the fibers have a practically rectilinear configuration so that even small stresses are sufficient to give rise to considerable inner tensions.

Moreover, said rectilinear configuration of the fibers in the direction of the stretching corresponds to a folding of those fibers which, being originally oriented in a direction orthogonal to the stretching direction, have received only a certain modification of their original position and, therefore, are unable to provide an elastic reaction comparable to that provided by the oriented and rectilinear fibers.

Consequently, when the amount of the stretching is large enough to cause a uniform orientation of the inextensible fibers and a rectilinear configuration of the oriented fibers, the mechanical anisotropy is considerably increased.

The stretching action can be carried out in various ways.

For instance, it can be carried out on a plane surface, by causing the material to pass from cylinders having a certain peripheral speed to other cylinders having speeds progressively increased in one or more steps in order to obtain an orientation of the fibers in the longitudinal direction of the sheet. In the case of several passages, the orientation and the distribution carried out in a passage are not affected in the next passage, so that the positive effects are advantageously summed up.

The stretching can also be carried out pneumatically by inflating a tubular extruded product until its diameter is increased to values higher than 150% with respect to the initial value. In this case the orientation of the fibers is obtained in a prevailingly transverse direction. It is also possible to stretch the fibers mechanically, e.g., by tensioning a length of an extruded tube by means of rotating rollers, the axes of which are progressively moved away.

The stretching can be effected on extruded products having a generic section by applying tension immediately downstream from the extruder. The tension may be obtained by means of conveyor belts or cylinders having a speed higher than the extrusion speed.

It has been ascertained that the nearly parabolic behavior of the anisotropy is particularly evident when a high degree of stretching is combined with a strong shrinkage in the transverse direction, the modulus of which must be reduced. In fact, said shrinkage cooperates in imparting the orientation to the fibers. In practice, a shrinkage greater than 60% along the greater dimension of the two directions orthogonal to the stretching direction may be obtained.

On account of the high stretching value, and above all when the stretching is accompanied by the shrinkage described above, it is possible to obtain modifications in the form and size of the section orthogonal to the stretching direction. For instance, from a rectangular orthogonal section, it is possible to obtain after stretching accompanied or not by shrinkage a section having a circular, triangular, trapezoidal or another geometrical configuration.

The shrinkage which may accompany the stretching is useful in preventing tears in the sheet in case of high stretching values. Moreover, to prevent tears, the sheet can be subjected to an appropriate heat treatment before stretching. A further heat treatment may be carried out on the sheet after stretching in order to facilitate its relaxation and to prevent its elastic recovery. In particular, in the case of subsequent stretching cycles, said heat treatment may be effected during said cycles.

A sheet containing the oriented and rectilinear fibers in accordance with the present invention finds use in the formation of a reinforcing structure for articles in which a mechanical anisotropy is desirable. Therefore, it is employed during the manufacture of pneumatic tires, belts and the like, in which case it is vulcanized together with the article. It is also possible to obtain articles possessing only a certain mechanical rigidity, for example, resilient strips for supporting upholsteries for seats or back rests. The strips are simply cut from said sheet along lines parallel to the stretching direction, or superposed sheets may be cut along coincident axes or axes forming a certain angle with one another.

In all these applications, the final product has improved properties when compared to those obtained according to conventional techniques. The improvement substantially lies in the fact that the product according to the invention, although it has the same elastic reaction, has a smaller weight and reduced dimensions with respect to the conventional products.

The invention is further illustrated by the following nonlimiting examples.

EXAMPLE I

A composition is prepared based on natural rubber and containing 20% of carbon black, vulcanizing agents, and adhesive agents for bonding to the fibers. The composition has a plasticity of 40–45 Mooney Large (1+4 100° C.).

Rayon fibers, having a length of 4 mm. and a count of 10 deniers, are added in an amount of 10 parts per 100 parts by weight of the composition. A sheet is obtained by calendering said composition. The sheet, joined with a provisional or removable layer, is wound around a metal cylinder. The free end of the sheet is fastened to a second cylinder which is mechanically connected to the first by means of a chain drive in such a ratio that the second cylinder rotates twice as fast as the first.

After a suitable heat treatment at about 40° C. to 110° C. for 15 to 60 minutes, the sheet is caused to pass from the first cylinder to the second. This passage causes a stretching of 100%. The stretched sheet is collected on the second cylinder together with another provisional layer. At the end of this operation, the first cylinder is removed, the second cylinder is mounted on the axis of the first, and the latter is mounted on the axis of the second. By rotating the cylinders, a second stretching of 100% is achieved. After allowing the sheet to rest for a sufficient period of time, which can be reduced by increasing the temperature to about 50° C. for 60 minutes, said sheet is employed, for instance, as the reinforcing structure of a pneumatic tire.

In the vulcanized article, the ratio existing in the sheet between the elastic modules in the direction of the orientation and the analogous moduls in the direction orthogonal to it is equal to 3.5.

EXAMPLE II

A composition is prepared, based on butadiene-styrene rubber and containing 15% of carbon black and the other usual ingredients. The composition has a plasticity of 47–50 Mooney Large (1+4 100° C.).

Nylon fibers having a length of 5 mm. and a count of 10 deniers are added to the composition in an amount of 13 parts per 100 parts by weight of the composition. Preferably, the fibers have been previously subjected to a known treatment to render them adhesive.

The sheet obtained from the final compound is subjected to a heat treatment at about 50° C. for 20 minutes. Then the sheet is stretched in three steps, for a value of 100% for each step, as indicated in Example I. Said heat treatment can be effected during the stretching or during one of said steps. After a vulcanization at about 130° C., the ratio between the elastic modulus in the direction of orientation and the analogous modulus in the direction orthogonal to it is equal to 5.

The mechanical anisotropy of the final product according to the present invention may have different values due in part to the stretching modalities and in part to the nature, size and concentration of the fibers incorporated in the initial compound.

What is claimed is:

1. A process for the production of a fiber reinforced plastic article comprising the steps of substantially uniformly and randomly incorporating fibers into a plastic material, forming said plastic material into sheet form, stretching the obtained sheet unidirectionally over 150% taking into account the possible elastic recovery, whereby the fibers are oriented to obtain a prevailing orientation so that the average number of fibers in a unit area of a section taken along a plane orthogonal to the direction of the prevailing orientation is at least 3 times the number of fibers in a unit area of a section taken along a plane parallel to the direction of the prevailing orientation and disposed to intersect the portion of the sheet having the smallest thickness.

2. A process according to claim 1, wherein the unidirectional stretching is carried out in at least two steps.

3. A process according to claim 1, wherein the stretching is carried out mechanically to enable the sheet to shrink at least about 60% along the greater dimension of the two directions orthogonal to the stretching direction.

4. A process according to claim 1, wherein the amount of fibers employed is at least 5 parts per 100 parts by weight of the plastic composition, and wherein said fibers are selected from the group consisting of natural textile material, synthetic textile material, metal, glass and asbestos.

5. A process according to claim 4, wherein said plastic material is a vulcanizable rubber.

6. The process of claim 1, wherein said fibers are from 0.5 to 50 mm. in length.

References Cited

UNITED STATES PATENTS

| | | | |
|---|---|---|---|
| 1,877,651 | 9/1932 | Eisenhardt | 264—108 |
| 2,899,704 | 8/1959 | Pekarek | 264—108 X |
| 3,247,038 | 4/1966 | Kraft | 156—229 X |

ROBERT F. BURNETT, Primary Examiner

R. O. LINKER, Assistant Examiner

U.S. Cl. X.R.

156—229; 264—210, 291